(12) United States Patent
Lauer et al.

(10) Patent No.: US 6,523,913 B1
(45) Date of Patent: Feb. 25, 2003

(54) PRESSURE CONTROL VALVE

(75) Inventors: Josef Lauer, Nonnweiler (DE); Christian Schulz, Riedstadt (DE); José Garcia-Quilon, Altenstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/601,903

(22) PCT Filed: Feb. 9, 1999

(86) PCT No.: PCT/EP99/00826

§ 371 (c)(1),
(2), (4) Date: Sep. 26, 2000

(87) PCT Pub. No.: WO99/41121

PCT Pub. Date: Aug. 19, 1999

(30) Foreign Application Priority Data

Feb. 11, 1998 (DE) .......................................... 198 05 404

(51) Int. Cl.[7] ................................................. B60T 8/36
(52) U.S. Cl. ................................ 303/119.2; 137/315.03
(58) Field of Search .......................... 303/119.1, 119.2, 303/119.3, DIG. 10; 137/315.03

(56) References Cited

U.S. PATENT DOCUMENTS

| | | | | |
|---|---|---|---|---|
| 5,076,538 A | * | 12/1991 | Mohr et al. | ............ 251/129.18 |
| 5,344,118 A | | 9/1994 | Kamiya et al. | |
| 5,460,437 A | | 10/1995 | Hara | |
| 5,577,322 A | * | 11/1996 | Ohshita et al. | .......... 29/890.13 |
| 5,653,249 A | | 8/1997 | Reinartz et al. | |
| 5,673,980 A | * | 10/1997 | Schwarz et al. | ......... 303/119.2 |
| 5,704,587 A | * | 1/1998 | Kuromitsu et al. | .... 251/129.15 |
| 5,984,432 A | * | 11/1999 | Otomo et al. | ............ 303/119.2 |
| 6,086,164 A | * | 7/2000 | Oehler et al. | ............ 303/119.2 |

FOREIGN PATENT DOCUMENTS

| | | |
|---|---|---|
| DE | 39 25 794 | 2/1991 |
| DE | 43 32 538 | 3/1995 |
| DE | 44 22 491 | 1/1996 |
| DE | 195 11 455 | 10/1996 |
| DE | 196 11 832 | 10/1997 |
| DE | 196 21 229 | 11/1997 |
| EP | 0 670 445 | 9/1995 |
| WO | 93 19961 | 10/1993 |
| WO | 95 03961 | 2/1995 |
| WO | 95 07201 | 3/1995 |

* cited by examiner

*Primary Examiner*—Christopher P. Schwartz
*Assistant Examiner*—Bradley King
(74) *Attorney, Agent, or Firm*—Rader, Fishman & Grauer PLLC

(57) ABSTRACT

The present invention relates to a pressure control valve including a valve housing which houses a valve seat in a housing opening, a valve closure member which is movable into abutment on the valve seat and adapted to interconnect or isolate pressure fluid channels connected to the valve seat, a bore in a guide element for the accommodation of the valve closure member which is axially movably supported on the wall of the valve housing. The valve closure member is attached in the guide element by way of a simplified press fit in conformity with the demands of automation. The assembly of the valve coil is simplified in addition.

6 Claims, 2 Drawing Sheets

PRESSURE CONTROL VALVE

TECHNICAL FIELD

The present invention relates to a pressure control valve, in particular, for slip-controlled automotive vehicle brake systems.

BACKGROUND OF THE INVENTION

U.S. Pat. No. 5,460,437 discloses a pressure control valve closed in its basic position, including a valve housing which houses in a housing opening a valve seat on which a valve closure member abuts. The valve closure member is inserted as a separate component into an electromagnetically operable guide element which is supported axially movably along the wall of the valve housing.

Special adjusting measures are necessary to manufacture a valve of this type in order to ensure a preset press fit depth of the valve closure member in the guide element for reliably opening and closing the valve seat. Fixing of the valve closure member in the guide element is based on a precisest possible press fit in order to prevent undesirable loosening or deforming of both press fit parts. The assembly of the valve coil is impaired due to the close fit tolerances. The valve coil is not universally applicable due to the integration of the yoke ring in the valve housing.

An object of the present invention is to provide a pressure control valve of the type indicated which does not suffer from the mentioned shortcomings.

Further features, advantages and possible configurations of the present invention can be taken in the following from the description of an embodiment by way of several Figures.

DETAILED DESCRIPTION OF THE PREFERRED EMBODIMENTS

Figure 1:
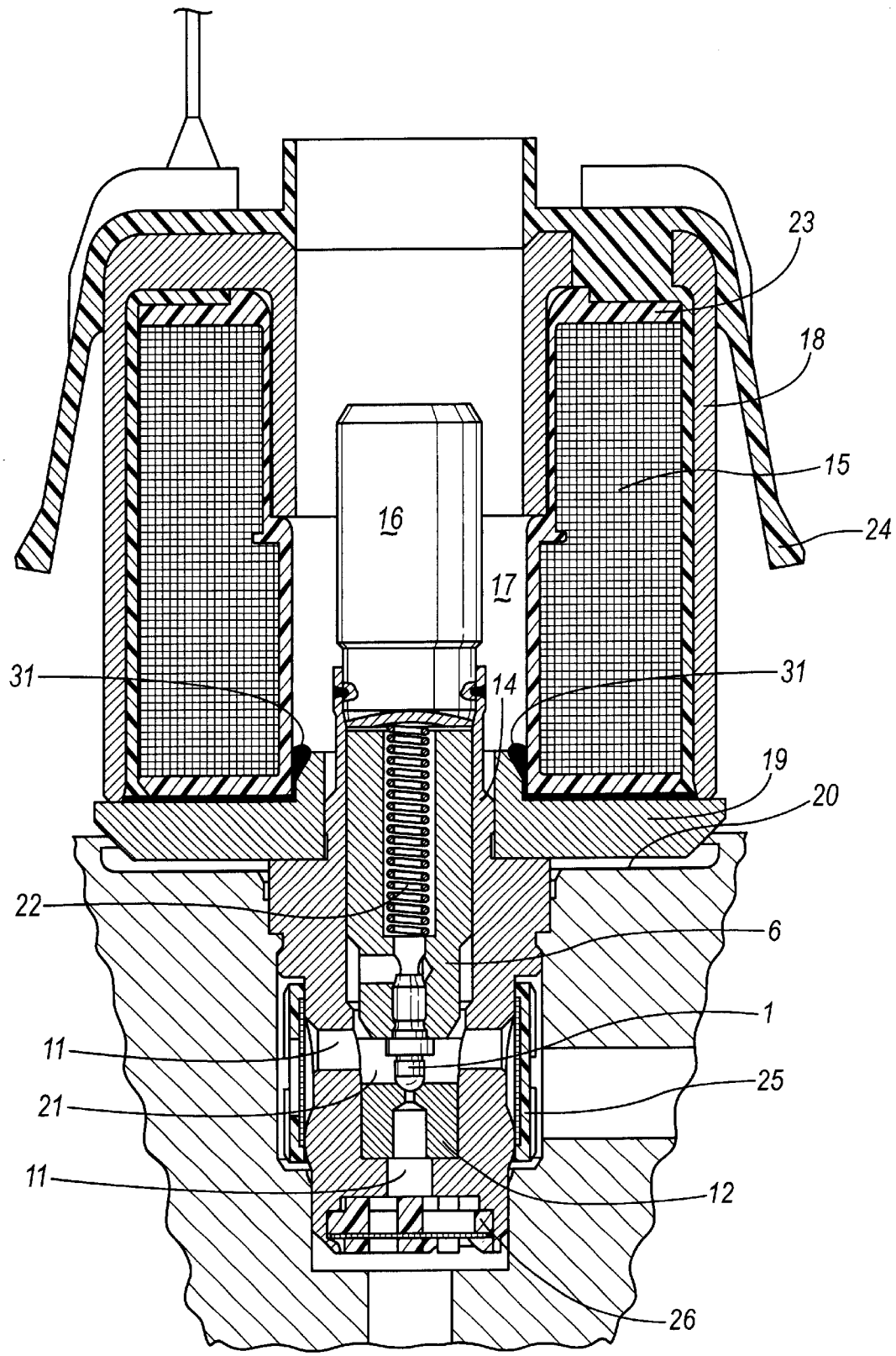
FIG. 1 is a longitudinal cross-sectional view of an electromagnetically operable pressure control valve.

The embodiment of FIG. 1 shows a considerably enlarged total view of the pressure control valve, closed in the initial position, which is used especially for slip-controlled automotive vehicle brake systems. In the present embodiment, valve housing 14 of the pressure control valve is designed in cartridge-type construction and, by way of self-scaling of the hard valve housing material that is preferably steel, is press fitted into a valve accommodating member 20 that is softer in comparison. The valve housing 14 accommodates in its housing opening 21 a valve seat 12 bearing against which is a valve closure member 1 that is pressed into a guide element 6 under the effect of a compression spring 22.

Guide element 6, in the function of a magnetic armature, is guided axially movably along the wall of the housing opening 21. For the electromagnetic actuation of the guide element 6, a valve coil 15 is arranged on the valve housing 14 and is centered on a solenoid end plate 19 arranged between the valve coil 15 and the valve housing 14. The valve housing 14 is closed on its sleeve-shaped stem portion on the side remote from the valve seat 12 by means of a press fitted and welded closure plug 16. The closure plug 16 performs the function of a magnetic core in the present embodiment. The valve coil 15 is encompassed by a yoke ring 18 that contacts the solenoid end plate 19 at the end of its external peripheral surface, while the other end of the periphery's inside extends only up to roughly the step of the coil carrier 23.

The result is an annular chamber 17 between the closure plug 16 and the coil 15 in the area of the coil carrier 23, the said chamber 17 extending from the solenoid end plate 19 until the open end of the yoke ring 18. In the present embodiment, the valve coil 15 together with the coil carrier 23 and the yoke ring 18 is an electric subassembly unit which permits independent handling and, by way of catching hooks fitted to it, is attached inside a cover (not shown) that includes electric and/or electronic components. These operations are effected before the subassembly unit is seated on the pressure control valve in the valve-accommodating member 20. As has already been mentioned, the valve coil 15 is centered on the sleeve-shaped stem portion of the valve housing 14 by way of the solenoid end plate 19. This is done by means of a conically stepped chamfer of the solenoid end plate 19 which extends in the direction of the annular chamber 17.

The provision of an annular chamber 17 disposed between the valve coil 15 and the pressure control valve favorably permits the use of a valve coil 15 of uniform and, thus, universal application for pressure control valves of different overall dimensions (so-called standard coil) and, if desired and needed, renders it possible to make use of the free space provided by the annular chamber 17 to take up a sealing compound 31 which in addition to, or instead of, the proposed catching hooks 24, ensures the desired engagement, attachment, and, optionally, also sealing of the valve coil 15 with respect to the housing assembly unit associated with the valve coil 15. Further, the annular chamber 17 facilitates fitting the valve coil 15 to the pressure control valve.

The proposed stepped sleeve contour of the valve housing 14, not only produces the best conditions for producing the necessary holding and sealing force within the valve-accommodating member 20, but also produces a simple arrangement of filter elements 25, 26 which are configured as plate-type and ring-type filters in the present embodiment which reliably protect the pressure fluid channels 11 which open into the valve housing 14 in the horizontal and vertical directions so that the valve's inside parts will not become contaminated. In the present embodiment, the valve seat 12 being a separate, rotationally symmetrical component, is press fitted and/or calked until the stop from the direction of the closure plug 16 which closes the housing opening 21. Manufacturing and fastening alternatives are possible, but they are not considered as a basic feature of the present invention.

Rather, the surprisingly simple clearance-free positioning of the valve closure member 1 on the guide element 6 will be referred to in the following. A special contour of the valve closure member 1 causes an absolutely reliable press fit in the guide element 6 during the press fit operation. For better illustration, FIG. 2 will be referred to in the following.

Figure 2:
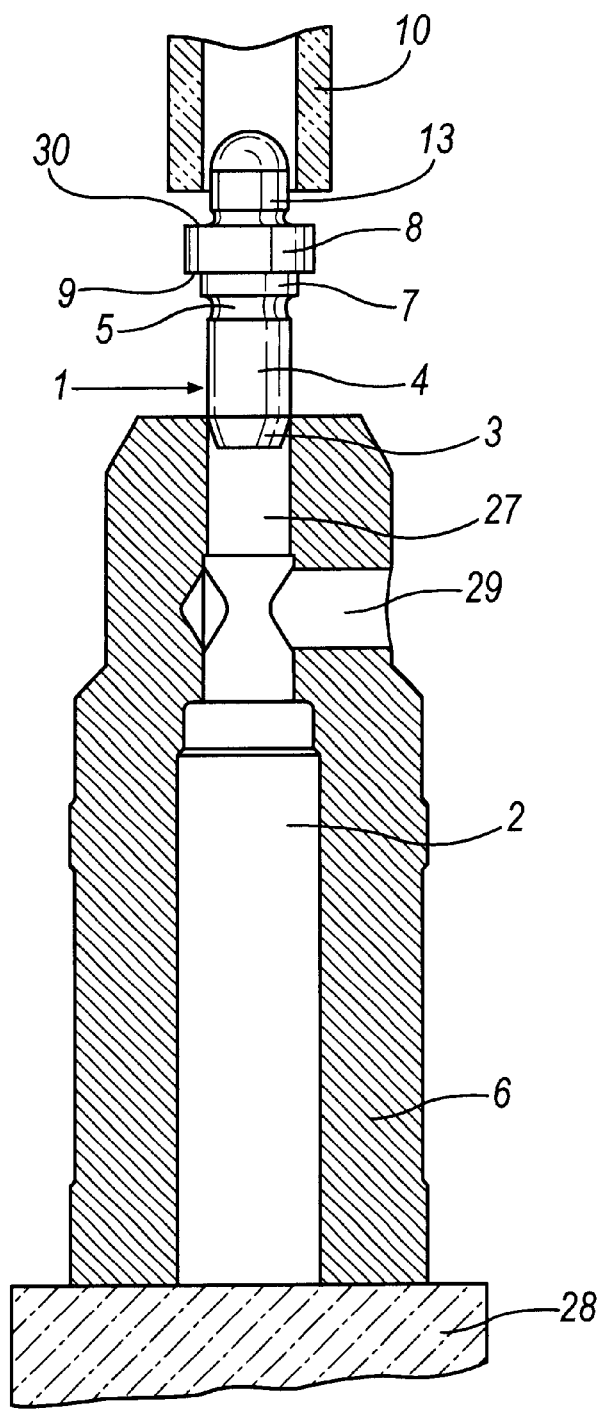
FIG. 2 shows a section of FIG. 1 for illustrating the valve closure member during the press fit operation into the guide element.

The embodiment of FIG. 2 shows in a considerably enlarged view the end of the guide element 6 remote from the valve closure member 1, which end is known from FIG. 1 and is supported on an abutment surface 28. A sleeve-shaped press fit tool 10 is aligned to the concentric straight-lined, i.e. not stepped, accommodating bore 27 for the valve closure member 1. The valve closure member 1 is arranged between the press fit tool 10 and the guide element 6 with its truncated-cone-shaped chamfer 3 in contact with the accommodating bore 27, thereby facilitating the press fit operation. Adjacent to the conical chamfer 3 is a stem portion 4 having a diameter which is conformed to the diameter of the bore 2 in the area of the accommodating bore 27 in a clearance-free manner. The stem portion 4 has a radially circumferential waist 5. Waist 5 is directly followed by a cylindrical displacement member 7 having an outside diameter which is larger than the bore diameter in the area of the accommodating bore 27. Following the displacement member 7 is a step in the shape of a collar 8 having an outside diameter which is considerably larger than the outside diameter of the displacement member 7.

Remote from the first stop shoulder 9 on the collar 9 is a second stop shoulder 11 on collar 8 for the accommodation of the press fit tool 10, as well as the spherical closure member 13 of the valve closure member 1 which is movable into abutment on the valve seat 12. In this respect, FIG. 2 illustrates the alignment of the above-mentioned parts at the commencement of the press fit operation, to what end the press fit tool 10 is slipped over the closure member 13, centered by it, if necessary, and moves into abutment on the second stop shoulder 30 in order to transmit the necessary press fit force onto the valve closure member 1.

FIG. 1 shows the valve closure member 1 in a position in which the chamfer 3 extends into the accommodating bore 27 and, with the cylinder-shaped stem portion 4, contacts the accommodating bore 27 so that, after having overcome the friction force, the valve closure member 1 moves into the accommodating bore 27 until abutment of the displacement member 7 on the guide element 6 with an almost constant effort of friction force. In this intermediate position, the waist 5 defined by the wall of the accommodating bore 27 forms an annular chamber into which the relatively soft material of the guide element 6 deforms as soon as the displacement member 7 enters into the guide element 6. The press fit operation of the valve closure member 1 is completed as soon as the first stop shoulder 9 that follows the displacement member 7 will abut on the end surface of the guide element 6. For the accommodation of the material of the magnetic armature deformed in the direction of the waist 5, if required, the groove-shaped waist 5 may have larger dimensions than shown, or an additional waist 5 on the stem portion 4 may be provided.

It is possible due to the disclosed invention to obviate the need for previously necessary additional calking measures and securing means for the valve closure member 1 and to monitor the press fit depth of the valve closure member 1. When the press fit operation is completed, the valve closure member 1 with its chamfer 3 will extend up to the area of a pressure compensating channel 29 which opens transversely to the valve closure member 1 and opens into the enlarged bore 2.

What is claimed is:

1. Pressure control valve, comprising:
   a valve housing which includes a valve seat in a housing opening,
   a valve closure member which is movable into abutment on the valve seat and adapted to interconnect or isolate pressure fluid channels connected to the valve seat,
   a guide element having a bore therein, said bore accommodating said valve closure member, wherein said valve closure member includes a conical chamfer portion, and wherein the conical chamfer portion is followed by a clearance-free jointing portion, wherein the clearance-free jointing portion includes a radially circumferential waist segment which accommodates a volume of material displaced during a press fit operation, adjacent the waist segment is a cylindrical displacement segment having a larger diameter than the bore in the guide element, wherein adjacent to the displacement segment is a collar having a first stop shoulder proximate to the accommodating bore which abuts on an outside contour of the guide element,
   a second stop shoulder distal from the first stop shoulder for accommodating a press fit tool, said valve closure member being movable into abutment on the valve seat.

2. Pressure control valve as claimed in claim 1, wherein the guide element is operable electromagnetically by means of a valve coil attached to the valve housing.

3. Pressure control valve as claimed in claim 1, wherein the valve housing is closed by means of a press-fitted-closure plug on a side of said housing remote from the valve seat.

4. Pressure control valve as claimed in claim 3, further including an annular chamber positioned between the closure plug and a coil.

5. Pressure control valve as claimed in claim 4, wherein the coil is encompassed in a yoke ring which, with its one end, abuts on a coil end plate centered on the valve housing and, with its other end, is isolated from the closure plug by the annular chamber.

6. Pressure control valve as claimed in claim 5, further including a sealing compound fixing the valve coil wherein said sealing compound extends into the annular chamber.

* * * * *

UNITED STATES PATENT AND TRADEMARK OFFICE
CERTIFICATE OF CORRECTION

| | | |
|---|---|---|
| PATENT NO. | : 6,523,913 B1 | Page 1 of 1 |
| DATED | : February 25, 2003 | |
| INVENTOR(S) | : Josef Lauer, Christian Schulz and José Garcia-Quilon | |

It is certified that error appears in the above-identified patent and that said Letters Patent is hereby corrected as shown below:

<u>Column 4,</u>
Line 35, change "by means of a press-fitted" to -- by means of a press fitted --.

Signed and Sealed this

Seventh Day of October, 2003

JAMES E. ROGAN
*Director of the United States Patent and Trademark Office*